United States Patent [19]

Dausmann

[11] Patent Number: 4,730,929
[45] Date of Patent: Mar. 15, 1988

[54] METHOD AND DEVICE FOR THE CONTACTLESS MEASUREMENT OF MOVEMENT

[76] Inventor: Günther Dausmann, Schlachthausstr. 9, D-8058 Erding, Fed. Rep. of Germany

[21] Appl. No.: 807,036
[22] PCT Filed: Mar. 21, 1984
[86] PCT No.: PCT/DE84/00065
 § 371 Date: Nov. 20, 1985
 § 102(e) Date: Nov. 20, 1985
[87] PCT Pub. No.: WO85/04257
 PCT Pub. Date: Sep. 26, 1985
[51] Int. Cl.[4] .............................................. G01P 3/36
[52] U.S. Cl. ...................................... 356/373; 356/28
[58] Field of Search ................................ 356/28, 373

[56] References Cited

U.S. PATENT DOCUMENTS

| | | | |
|---|---|---|---|
| 2,772,479 | 12/1956 | Doyle | 356/28 |
| 3,045,232 | 7/1962 | Mercer. | |
| 3,059,521 | 10/1962 | Clemens et al. | 356/28 |
| 3,500,050 | 3/1970 | Hillman | 356/28 |
| 3,511,150 | 5/1970 | Whitney et al. | 356/28 |
| 3,950,099 | 4/1976 | Malueg | 356/28 |

FOREIGN PATENT DOCUMENTS 1448488 9/1969 Fed. Rep. of Germany.

OTHER PUBLICATIONS

Optische Sensoren zur Beruhrungslosen und Schlupffreien weg- und Weschwindigkeits-Messung an Landfahrzeugen, pp. 2-4.
Richtungserkennung Bei Beruhrungsloser Geschwindigkeitsmessung Mit Optischen Gittern, pp. 2-4.

Primary Examiner—R. A. Rosenberger
Attorney, Agent, or Firm—Toren, McGeady & Associates

[57] ABSTRACT

A method is indicated for the contactless measurement of the relative movement of an object (14) relative to a scannable pattern (12), a scanning beam (31) being generated which scans a portion of pattern which moves with the object along a scanning path on the pattern in order to produce a scanning signal. In order easily to be able to establish the angle between a reference direction rigid with the object and the direction of movement of the pattern in relation to the object, it is proposed that the scanning beam be displaced parallel with and/or pivoted along a curved guide path rigid with the object, the movement of the scanning beam occurring in accordance with a guide angle function and in that furthermore there is derived from the scanning signal a density signal which indicates the time pattern of the reciprocal value of the time interval between the scanning pulse at any given moment and the preceding scanning pulse, possibly averaged out and in that the phase location of the density signal is determined in relation to the guide angle function. The angle sought corresponds to this phase location.

17 Claims, 13 Drawing Figures

METHOD AND DEVICE FOR THE CONTACTLESS MEASUREMENT OF MOVEMENT

The invention relates to a method for the contactless measurement of the relative movement of an object in relation to a scannable pattern, a scanning beam being generated which scans the pattern along a scanning path over a portion of the pattern which moves with the object, in order to generate a scanning signal from a series of scanning pulses corresponding to pattern structure elements on the pattern portion.

In the case of a known method of this type (P. Kreutzer, Richtungserkennung bei beruhrungsloser Geschwindigkeitsmessung mit optischen Gittern, Zeitschrift Feinwerktechnik und Messtechnik 83 (1975), No. 7, pp. 330 to 332, Carl Hanser Verlag, Munich), the pattern is scanned through an optical scanning system rigid with the housing; therefore, the scanning path corresponds to the path of movement of the object relative to the pattern. By means of a plurality of photo receivers disposed behind a grid, a plurality of scanning signals are generated from the superposition of which it is possible to ascertain the sign of the direction of movement of the object relative to the pattern.

The object on which the invention is based lies in indicating a method of the type mentioned at the outset, by means of which it is possible to ascertain the angle between a reference direction rigid with the object and the direction of relative movement of the object in relation to the scannable pattern.

This problem is resolved in that (a) the scanning beam is so pivoted and/or displaced parallel with and along a curved guide path rigid with the object that the scanning path results essentially as a superposition of the scanning movement along the guide curve upon the relative movement of pattern and object, the movement of the scanning beam along the guide curve occurring to a guide angle function which indicates the time curve of the momentary angle (guide angle) between a reference direction rigid with the object and the radial beam leading from the centre point of curvature of the guide curve to the scanning beam, (b) and in that there is derived from the scanning signal a density signal which indicates the time curve of the reciprocal value of the time interval between the momentary scanning pulse and the preceding scanning pulse, possibly averaged out over an averaging period which is small in relation to the scanning time needed to move the scanning beam along the guide curve, and (c) in that the phase location of the density signal in relation to the guide angle function is determined which corresponds to the angle between the reference direction and the direction of movement of the pattern in relation to the object.

The method according to the invention is based on the knowledge that during scanning of the scanning pattern along a scanning path being a superposition of the relative movement of object and pattern and the movement of the scanning beam along the curved guide curve which is rigid with the object, a specific scanning signal results wherein the time interval between successive scanning pulses depends in predetermined manner upon the angle between the radial beam and the direction of relative movement of object and pattern. If this absolute angle amounts for example to 90°, which in the case of a circular guide curve means that the momentary direction of movement of the scanning beam along the guide curve extends parallel with the direction of relative movement, then a scanning signal is obtained with particularly rapidly or particularly slowly consecutive scanning pulses according to whether, at the time, the scanning beam is moving along the guide curve in opposition to or together with the pattern. In this case, the density signal assumes a maximum or a minimum as the case may be. With an absolute angle of 0°, the result is an average value of the density signal to which, in the case of a uniform movement of the scanning beam along a partial or complete circle, a reversal point of the substantially sinusoidal density signal corresponds. Consequently, from the phase location of the density signal in relation to the guide angle function, it is possible readily to arrive at the angle sought and referred to hereinafter as the movement direction angle, this being the angle between the reference direction rigid with the object and the direction of movement of the pattern in relation to the object. It is possible in a particularly simple manner directly to arrive at the movement direction angle by ascertaining a reversal point of the density signal and the guide angle associated with this reversal point. Since in this case the absolute angle is 0°, the desired movement direction angle is identical to the guide angle. The method according to the invention is suitable both for periodic patterns (e.g. dot patterns) as well as for patterns with statistically distributed pattern structure elements. In the latter case, it is expedient when forming the density signal to average out the time interval values over an averaging period which is small in relation to the scanning time in order to obtain a density signal form which is closer to the sinusoidal form and which can therefore be better processed.

The sign of the movement of direction of the pattern in relation to the object can be easily ascertained by establishing whether the point of reversal of the density signal is followed by a minimum or a maximum value of the density signal. In the first case, the pattern is moving in relation to the object in the same direction as the scanning beam along the guide curve, i.e. relative to the object.

According to the invention, the path travelled by the pattern in relation to the object can be ascertained by simple means in that:

(a) by parallel displacement and/or pivoting of a scanning beam along a first and a second guide curve portion having common end points rigid with the object or of two scanning beams in each case along one of the guide curve portions and in each case for the same scanning period, a first and a second scanning path portion resulting from the relevant superposition of the scanning beam movement along the guide curve portions and a relative movement of the pattern in relation to the object is or are scanned, the movement of the scanning beam along the first guide portion having a speed component in the direction of movement of the pattern in relation to the object which has substantially always the same sign which, in its amount, is greater than the speed of the pattern in relation to the object, the movement of the scanning beam along the second guide curve portion having a speed component which lies in the direction of movement of the pattern in relation to the object and substantially always being of opposite sign, and in that (b) the number of scanning pulses of the scanning signal which occur during movement of the scanning beam along the first guide curve portion and the number of scanning pulses of the scanning signal which occur during movement of the scanning beam along the second guide curve portion are ascertained and the quotient determined from the difference and the sum of the two figures and being proportional to the path travelled by the pattern in relation to the object and during a scanning time.

An essential condition of a fairly accurate result in terms of distance travelled is only that the distribution of pattern structure elements be fairly constant in relation to the length of the guide curve portion. Consequently, it is also possible to use patterns with correspondingly statistically distributed pattern structure elements for path measurement even though periodic patterns lead to more exact results. In the latter case, the two guide curve portions may also be constituted by straight portions of curves parallel with the direction of movement of the pattern in relation to the object. From the point of view of equipment, it is particularly simple to carry out the method in the case of periodic patterns if the two guide curve portions are constituted by hemispherical arc which supplement each other to form a circle, the diameter connecting the ends of the arcs being substantially parallel with the direction of movement of the pattern in relation to the object.

In the case of a pattern having more or less evenly distributed pattern structure elements, the error of measurement is decidedly diminished if the two guide curve portions are constituted by two substantially coincident hemispherical arcs with a corresponding orientation of the diameter connecting the arc ends. Upon the return of the scanning beam along the hemispherical arc, it scans on the pattern a portion of the scanning path which, according to the ratio of the speed of relative movement of the object to the speed of movement of the scanning beam along the guide curve may differ only slightly or rather more from the portion of scanning path on the outward journey.

A prerequisite for path measurement by scanning along the semi-circular arcs is that the diameter connecting the ends of the arcs is parallel with the direction of movement of the pattern in relation to the object. In the event that the direction of the relative movement of pattern and object is predetermined and constant, no difficulties arise, In the case of alternating relative movement directions, the particular direction at any given time can be determined for example by the method mentioned at the outset, whereupon the semi-circular arcs can then be orientated accordingly. If for example half diaphragms are used to fix the semi-circular arcs, then their spatial position must be readjusted according to the direction of movement at that particular moment.

In a further development of the invention, such readjustment of mechanical elements is unnecessary. This is achieved in that two scanning beams are moved in opposite directions along a closed preferably circular guide curve and in that from the two scanning signals generated by the two scanning beams, the density signal is in each case derived and its phase location determined and in that for one of the density signals the two density signal reversing points which in time lead and follow a density signal maximum, and the number of scanning pulses between these reversal points are ascertained and in that with the other density signal the two density signal reversal points which lead and follow a density signal minimum and also the number of scanning pulses between these reversal points are ascertained. Accordingly, the pattern is scanned twice, the two scanning beams being guided along identical circular guide curves but in opposite directions. Two density signals are derived from the two scanning signals and in the case of one, the sine half-cycle containing the density signal maximum is determined and with the other the half-cycle containing the minimum. Corresponding to these two half cycles are in turn coincident portions of semi-circles, the diameter connecting the ends of the arcs being parallel with the direction of movement of the pattern in relation to the object. From the number of scanning signals occurring during one or other half-cycle, it is possible to ascertain the distances travelled by the pattern in relation to the object.

It is conceivable for the pattern to comprise magnetic or electrostatic or radioactive pattern elements which can be scanned by correspondingly constructed converters. The method is particularly simple to carry out if the pattern is scanned visually.

The invention furthermore relates to a device for the contactless measurement of the relative movement of an object in relation to a scannable pattern particularly by carrying out the previously described method and which is characterised by at least one rotating scanning beam guide, preferably in the form of at least one rotating perforated diaphragm in the path of the beam from at least one optical scanning system, the said diaphragm establishing the scanning beam by correspondingly fading out a portion of the image.

From the article by R. Arzt and H. Ringelhahn entitled "Optische Sensoren zur Burhrungslosen und schlupffreien Weg- und Geschwindigkeitsmessung an Landfahrzeugen" (Optical Sensors for the Contactless and Non-Slip Measurement of Travel and Speed on Land Vehicles Zeitschrift Feinwerktechnik und Messtechnik 1978, No. 2, pp. 69 to 71, it is indeed known per se, in the case of a device of this type, to locate a rotating element in the path of the rays from an optical scanning system. This is however a rotating prismatic grid plate which periodically breaks a scanning beam, the scanning beam extending in stationary manner vis-a-vis the object carrying the rotating prismatic plate, in contrast to the invention in which the scanning beam is caused by the diaphragm to perform a rotating movement in relation to the object.

According to the invention, the construction is particularly simple from the optical point of view in that a light sensor is provided at the focal point of the optical scanning system on the image side and can be preferably formed with photovoltaic cell. After appropriate amplification, the photocurrent from the photovoltaic cell gives the scanning signal directly.

In particular in the case of patterns with statistically distributed pattern structure elements, it is advantageous to scan the pattern along coincident portions of curved paths for directional and/or distance measurement. To this end, the invention suggests disposing an arrangement for image splitting with a partially pervious mirror inclined at an angle to the optical axis of the optical scanning system and adjacent to and parallel with the latter mirror a fully reflecting mirror located in the path of rays of this or some further optical scanning system.

In order to arrive at identical semi-circularly arcuate scanning path portions, it is suggested that a rotating perforated diaphragm and a light-impervious half-diaphragm which half covers the perforated diaphragm be provided in the path of rays between the partly pervious mirror and the associated light sensor and in the path of rays between the fully reflecting mirror and the associated light sensor and in that the perforated diaphragms rotate in opposite directions and establish two scanning beams which, when the pattern is stationary in relation to the object, scan substantially identical semi-circularly arcuate portions of the scanning path. In this case, it is sufficient if one light sensor is used which is associated with both perforated diaphragms. Optical construction is simplified if only one optical scanning system is associated with the two perforated diaphragms.

To scan the pattern along substantially identical full circles it is according to the invention suggested that a rotating perforated diaphragm be disposed in the path of rays between the partly pervious mirror and a first light sensor and another in the path of rays between the fully reflecting mirror and a second light sensor and that the perforated diaphragms rotate in opposite directions and establish two scanning beams which, when the pattern is still in relation to the object, scan substantially identical full circles on the pattern. Of the two scanning signals obtained in this way, it is possible according to the method mentioned accordingly hereinabove to derive two density signals, to ascertain the number of scanning signals occurring during the corresponding half-cycles of the density signal and deriving the distances therefrom by forming a quotient.

By corresponding time-related differentiation of the distances ascertained, it is possible without problem to arrive at the speed of relative movement of the pattern in relation to the object.

From U.S. Pat. No. 3,045,232 it is known to ascertain the amount of the relative movement speed and also the direction of movement by using a scanning beam which is guided along an arc. The U.S. Patent does not reveal how the path travelled by the object in relation to the scannable pattern can be ascertained.

Therefore, the object on which the invention is based resides in so further developing the method of the type mentioned at the outset that it also makes it possible to ascertain the distance travelled. One essential and basic idea underlying the invention is that the same semi-circular arc is scanned in both directions (either by means of two oppositely rotating scanning beams or by a single scanning beam of which the direction of movement is reversible), the scanning pulses measured being totalled for each semi-circular arc. Consequently, it is also possible to scan patterns having irregular pattern structure elements for the contactless measurement of the distance travelled since the premise must be adopted that during the double scanning of the semicircular arc in both directions, the irregular pattern will change only insubstantially by reason of the relative movement. Scanning according to the invention, along a semicircular arc in both directions, in which case it is essential that the diameters connecting the ends of the semicircular arcs extend parallel to the direction of relative movement cannot be derived in any way from the aforesaid U.S. Patent, since there the scanning beam always moves in one direction and along a full circle.

Swiss Patent Specification No. 523 504 only reveals that the velocity amplitude of a linearly oscillatingly reciprocated statistical pattern can be ascertained in that a stationary scanning beam can be used for oscillatingly scanning the pattern along a straight path, the scanning signal obtained being passed through a low pass filter in order to be able to arrive at the amount of the speed from the amplitude of the filtered signal obtained. In contrast to the method according to the invention, however, it is not possible to ascertain any desired direction of relative movement from the scanning signal. The Swiss Patent Specification does not reveal how it is possible to establish the path travelled, possibly with changing directions of movement, by a contactless process.

The invention will be explained in detail hereinafter with reference to a plurality of examples of embodiment and with reference to the accompanying drawings, in which.

Figure 1:
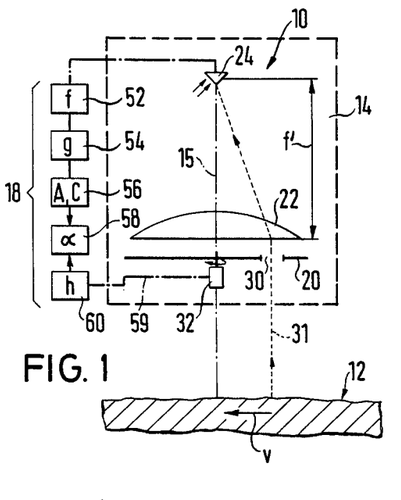
FIG. 1 is a diagrammatic view of a first embodiment of device according to the invention for the contactless measurement of movement.

As will be explained in greater detail hereinafter, it is possible by means of the device 10 shown in broadly diagrammatic form in FIG. 1 and intended for the contactless measurement of movement, quickly and reliably and with simple means to measure the movement of the pattern 12 indicated at the bottom in FIG. 1 in relation to an object 14 carrying the device 10 and indicated by a broken line. In FIG. 1, it is assumed that the object 14 is stationary; the object can, however, also move in relation to the pattern 12 since according to the invention the relative movement, particularly the direction of relative speed v of the pattern 12 in relation to the object 14 and also the relative displacement path s is measured. The direction of movement of the pattern 12 in relation to the object 14 can for example in a reference system rigid with the object be established by the angle α shown in FIG. 2 between the direction of the speed vector v and a reference direction 16 which is rigid with the object. This angle α can according to the invention be rapidly and easily ascertained and furthermore the sign of the direction of movement and also the path travelled by the object 14 in relation to the pattern 12 and finally also the speed of movement v.

For this, the device 10 requires in addition to an evaluating circuit 18 shown in block diagram form in FIG. 1 only a rotating perforated diaphragm 20, an optical display system 22 shown symbolically as a condenser lens in FIG. 1 and having a focal length f' and also a photovoltaic cell 24 at the focal point of the optical display system 22.

The perforated diaphragm 20 is provided with a diaphragm aperture 30 which is at a distance r from the axis of rotation of the perforated diaphragm 20 which coincides with the optical axis 15 of the optical display system. Therefore, as the perforated diaphragm 20 rotates (in a clockwise direction in FIG. 2) at the angular velocity $\omega$ in the reference system rigid with the object, the aperture 30 describes a circle 48 of radius r. The radial beam 50 which intersects the centre of the hole and which emerges from the centre point 48a of the circle subtends with the reference direction 16 an angle $\beta$. The angle between the radial beam 50 and the direction of the velocity v is designated $\gamma$ in FIG. 2. In the position of the diaphragm at any given moment, according to FIG. 2, the amount of the angle $\alpha$ is given by the sum of the amounts of the angles $\beta$ and $\gamma$.

The optical display system 22 depicts on the photovoltaic cell 24 the portion of the pattern 12 (pattern portion) which is cut out by the hole 30 in the perforated diaphragm 20. The pattern 12 may consist of statistically distributed irregularly disposed strips 12a which stand out from a background in that they are either brighter or darker. The pattern 12 can also be an irregular pattern of a different type, such as for example a dot pattern. The only condition is that in the portion defined by the circle 48, the pattern 12 should with reference to the distance apart of the individual pattern structure elements (here strip 12a) be fairly evenly distributed over the area.

In the case of a stationary pattern 12 in relation to the object 14 and with a perforated diaphragm 20 rotating at the angular speed $\omega$, there is a circular scanning path on the pattern 12. Therefore, the pattern structure elements (here the strip 12a) are scanned one after another by the scanning path. The photovoltaic cell 24 gives off after corresponding amplification and passage through a pulse forming stage a scanning signal f consisting of a series of individual pulses, the scanning pulses, which correspond to the individual pattern structure elements which are scanned. The time interval $\Delta t$ varies statistically during one rotation, according to the pattern distribution.

Figure 2:
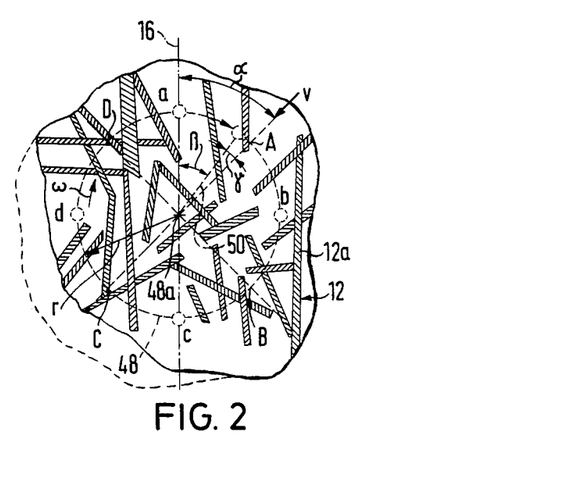
FIG. 2 is a plan view of the pattern underneath the perforated diaphragm of the device according to FIG. 1.
Figure 3:
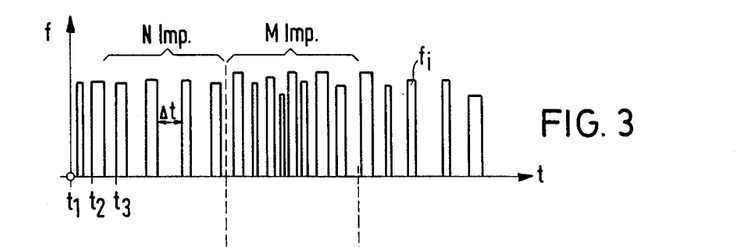
FIG. 3 is the scanning signal given off by the photovoltaic cell of the device according to FIG. 1.

If the pattern 12 is set in motion in relation to the object 14 in the direction of the speed vector v, then there is a corresponding modulation of the scanning signal f since now the scanning path on the pattern 12 is cycloidal. The amount of the peripheral speed $\omega \cdot r$ is thereby always larger than the amount of the speed v. In FIG. 2, in the reference system which is rigid with the object, there are four momentary scanning positions of the hole 30 in the diaphragm 20 and thus of the scanning beam 31 defined by the hole 30 and designated A, B, C and D, and these enclose with the direction of the speed v an angle $\gamma$ of 0°, 90°, 180° and 270° respectively. At points A and C, the direction of movement of the hole 30, i.e. of the scanning beam 31, at any given time extends along the circle 48 rigid with the object and at a right-angle to the direction v; at points B and D, the scanning beam moves along the circle 48 in the same direction as the pattern 12 in relation to the object 14 or in the opposite direction. It is evident that at point D the scanning beam per unit of time, by virtue of the opposite movement of scanning beam and pattern, can scan substantially more pattern structure elements than at point B, where the scanning beam moves in the same direction although at a greater speed, than the pattern 12 in relation to the object 14. As indicated in broadly diagramatic form in FIG. 3, a scanning signal is consequently obtained having pulses spaced apart by time intervals $1/\Delta t$ which are reciprocal and modulated according to the radian frequency $\omega$. The superposed FIGS. 3, 4 and 5 have identical time scales. It can be seen that at points B and D shown in FIG. 4 the reciprocal time interval $g_i$ of successive scanning pulses $f_i$ is minimal or maximal. If according to FIG. 4, at successive equidistant points in time $t_1$, $t_2$, $t_3$, etc., the mean reciprocal time interval of successive pulses within the interval just completed are plotted and if these points $g_1$, $g_2$, $g_3$, etc., are joined, then the result is the curve shown in FIG. 4 and designated g and hereinafter referred to as the "density signal". This density signal substantially follows a sinusoidal curve on which statistical fluctuations are superimposed by reason of the statistical distribution of the locations of the pattern structure elements. The minimum of this sinusoidal modulation lies at point B, the maximum at point D and the points of reversal are at points C and A. If necessary, the modulation component can be filtered out of the statistically fluctuating signal for further processing.

Figure 5:
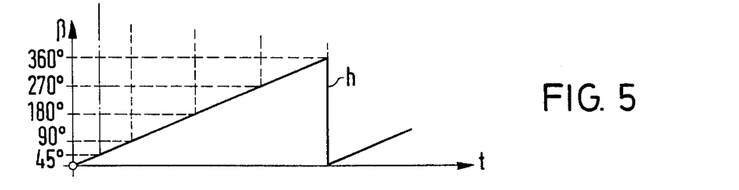
FIG. 5 shows the guide angle function.

FIG. 5 shows the time pattern of the angle $\beta$ between the reference direction and the radial beam 50 passing through the scanning beam. By virtue of the regular radian frequency $\omega$, a triangular stepped graph results. To ascertain the desired movement direction angle $\alpha$ between the reference direction 16 and the direction of the speed v, it is now only necessary to ascertain the phase shift of the density signal g in relation to the guide angle function curve h in FIG. 5. FIG. 2 shows that point A in time, which constitues one of the reversal points of the density signal g and which corresponds to the position A in FIG. 2, is the point at which the desired angle $\alpha$ is equal to the angle $\beta$. According to FIG. 5, $\beta$ at this point is for example 48°. The pattern 12 accordingly moves in relation to the object 14 through an angle of 45° in relation to the reference direction 16 which is rigid with the object. To determine the angle $\alpha$ it is naturally also possible to use the extremes of the sinusoidal form of the density signal g, in which case then 90° or 270° respectively must be deducted from the corresponding angle $\beta$.

The evaluating circuit 18 by means of which the direction can be determined comprises a block 52 which emits the scanning signal f and if necessary amplifies the electrical signal given off by the photovoltaic cell 24, converting it to the form of a pulse. This is followed by a block 54 which derives from the scanning signal f the density signal g according to FIG. 4. The next block 56 in succession determines the phase location of the density signal g, for example in that the points of reversal A and C of the sinusoidal form of density function g are ascertained. A block 60 which through a conductor 59 obtains the data from the motor 32 through the relevant rotary position of the diaphragm 20 at any given time forms the guide angle function h according to FIG. 5. For example, by means of a coincidence circuit, a block 58 establishes which monetary angle corresponds to one or other reversal point A or C. This angle is then the desired movement direction angle $\alpha$.

Figure 4:
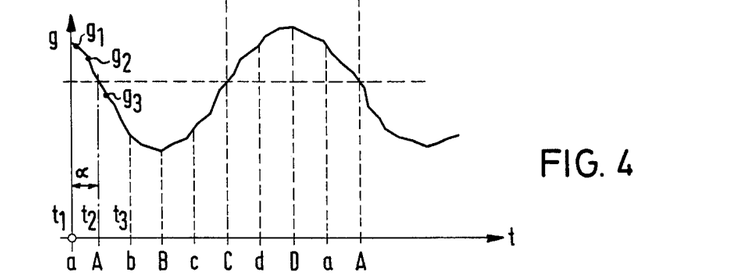
FIG. 4 is the density signal derived from the scanning signal.

With reference to FIGS. 2 and 4, it must be added that the letters a, b, c and d indicate those moments when the scanning beam 31 forms in sequence an angle $\beta$ of 0°, 90°, 180° and 270° with reference direction 16.

Figure 6:
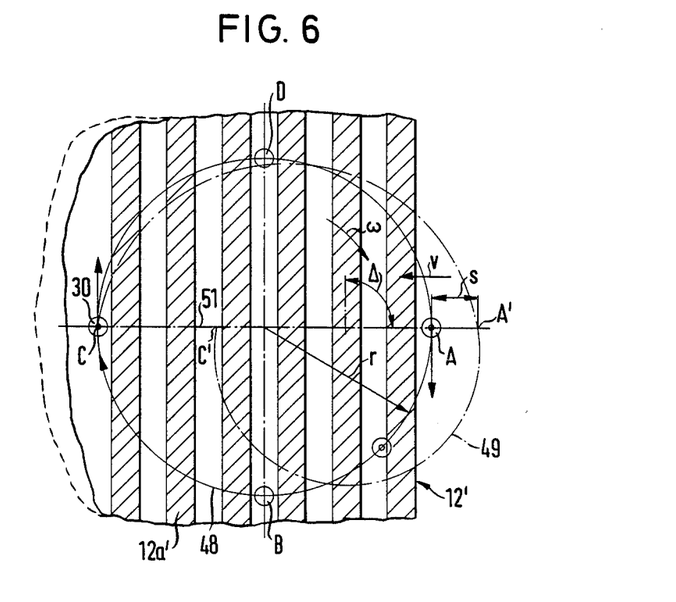
FIG. 6 is a plan view of a periodic pattern underneath a perforated diaphragm similar to that in FIG. 2.

FIG. 6 shows a strip pattern 12' consisting of parallel periodically disposed strips 12a', of which the strip width and gap between strips are substantially constant. If this strip pattern according to FIGS. 1 to 5 is scanned by a rotating perforated diaphragm, then it is possible as follows easily and quickly and with minimal outlay on apparatus to ascertain the paths travelled by the pattern 12' in relation to the object. In the case of a movement of the hole 30 from position C along the circle 48 and into position C again, the scanning beam describes on the strip pattern the scanning path 49 indicated by dash-dotted lines in FIG. 6. The point A' of the scanning path which corresponds to point A of the reference system which is rigid with the object is displaced outwardly in relation to the point A by the distance s travelled by the pattern during the half-cycle and in relation to the object. Correspondingly, the scanning beam scans a number M of strips 12a' which is proportional to 2r+s. At the end of the next half-cycle, the scanning beam arrives at point C' of the scanning path 49 which corresponds to the point C of the circuit 48 which is rigid with the object. The number N of strips 12a' scanned during this half-cycle corresponds to the distance between the locations of A' and C', in other words the value 2r−s. This gives us the distance s travelled in a half-cycle by the pattern and in relation to the object, as follows:

$$s = (M-N)/(M+N) \cdot 2r.$$

For measuring distance, it is therefore only necessary to pick up the scanning signal f and establish the number M and N of scanning pulses which occur one after another between two passes of the scanning beam through the pitch circle diameter (points A and C) parallel with the speed v. If the reference direction 16 is placed parallel with the direction v, which is in turn at a right-angle to the direction of the 12a', then points A and C correspond to the angle $\beta$ of 0° and 180°.

It is evident that if the angle between the strip length direction and the speed v diverges from 90°, then a path s' is calculated which is proportion to sine $\Delta$, $\Delta$ being the angle between the longitudinal direction of the strips and the direction of movement v.

In accordance with the method described at the outset with reference to FIGS. 1 to 5, it is possible also with linearly periodic strip patterns according to FIG. 6 to establish the angle between a reference direction rigid with the object and the movement direction v. The density signal g derived thereby from the scanning signal f does however diverge from the form:

$$C_1 \cdot \sin(\omega + C_2) + C_3 \qquad \text{(according to FIG. 4)}$$

since this has superimposed on it the function $$C_4 \cdot |\sin(\omega t + C_2)|$$

Figure 6A:
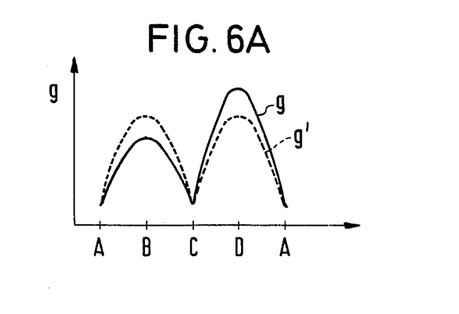
FIG. 6A is the density signal which occurs when scanning the pattern according to FIG. 6.

This is due to the fact that the scanning signal and thus the density signal is modulated already while the pattern is stationary since, upon passage of the scanning beam through the points C and A, with the direction of beam movement momentarily parallel with the longitudinal direction of the strips, there is momentarily a very slow strip change, whereas at points B and D the strip change occurs relatively quickly. With the superimposition of this part and the sinusoidal part in the same way as FIG. 4, brought about by movement, the result is for example the form of density signal g indicated in FIG. 6a, the part of the signal occurring while the pattern is stationary being indicated by the dots. The location of the maxima of the two half-cycle partial curves A to C and C to A corresponds exactly to points B and D so that these maxima should preferably be used for determining the direction angle $\alpha$. However, the points A and C can also be used.

The previously described method of measuring the distance travelled by the pattern in relation to the object can also be carried out in the case of a pattern having pattern structure elements, e.g. according to FIG. 2, distributed statistically regularly over the area. The number of pattern structure elements scanned during a movement of the scanning beam from point C to point A is proportional to the length of the corresponding portion C-A' of the curved path according to FIG. 6. The length of this portion of curved path is for distances a small compared with r and approximately proportional to 2r+s; correspondingly, the length of the portion A'-C' of the scanning path is proportional to 2r−s, so that the same expression as for the strip pattern is obtained for the distance s travelled during a half-cycle.

Figure 7:
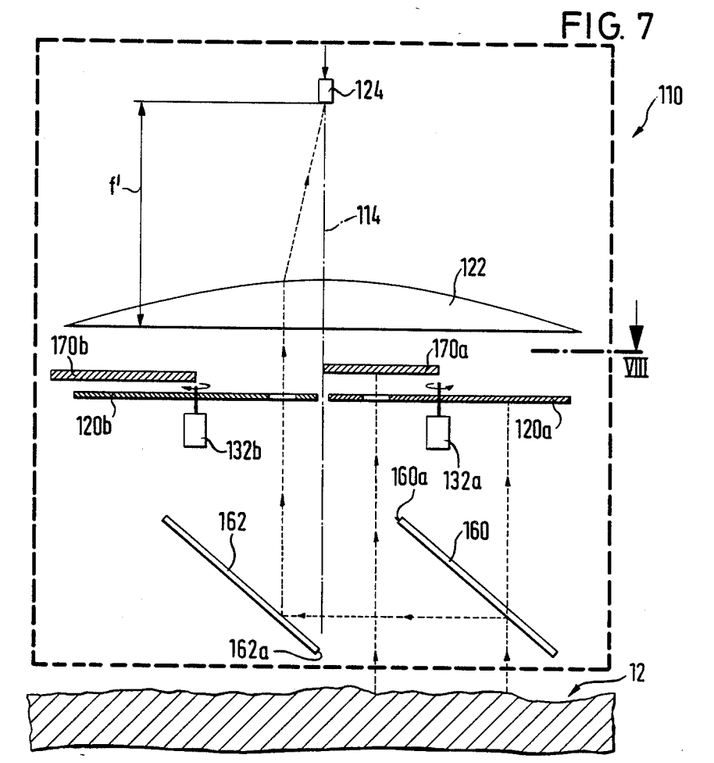
FIG. 7 shows a second embodiment of the device according to the invention.
Figure 8:
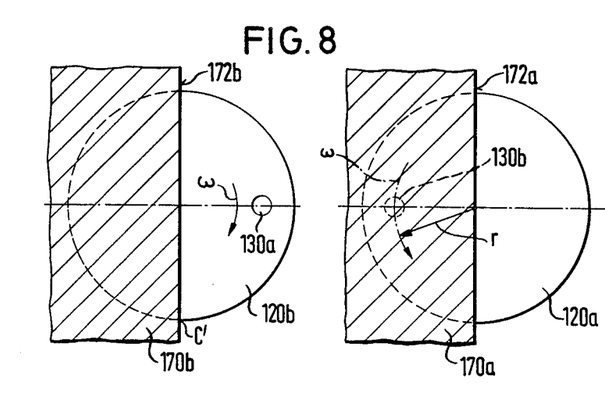
FIG. 8 is a plan view of the rotating diaphragms of the device according to FIG. 7 (arrow VIII in FIG. 7)

FIGS. 7 and 8 show an embodiment of the device according to the invention which is generally designated 110 and which is intended for determining distance travelled in the case of patterns having statistically distributed pattern structure elements. Similarly to FIG. 1, the device 110 consists of an optical scanning system symbolised by a condenser lens 122 and having a focal length f', with a photovoltaic cell 124 disposed at the focal point on the image side. Between pattern 12 and optical scanning system there is an arrangement for image splitting, consisting of a partly pervious mirror 160 inclined to the optical axis 114 and adjacent to and parallel with this a fully reflecting mirror 162. The upper transverse edge 160a and the lower transverse edge 162a of the two mirrors 160, 162 lie one above the other and form a right-angle with the optical axis 114. The part of the pattern 12 located at the bottom of the semi-pervious mirror 160 shown on the right in FIG. 7 can thus, on the one hand, in a view through the mirror 160, be scanned directly by a rotating scanning disc 120a above it and on the other after double reflection on the mirrors 160 and 162 through a second perforated diaphragm 120b located above the mirror 162. The perforated diaphragm 120a is set in motion by a motor 132a, the axis of rotation being approximately central above the mirror 160 and extending at a distance from and parallel with the optical axis 114. At the same distance but on the left-hand side of the optical axis 114 in FIG. 7 extends the axis of rotation of the motor 132b which drives the disc 120b. As the plan view in FIG. 8 shows, the two perforated diaphragms 120a and 120b rotate in opposite directions, in fact at the same frequency $\omega$. The distance r between the relevant hole 130 and the axis of rotation is the same in both cases. In each case the same half (the left-hand half in FIGS. 7 and 8) of the two perforated diaphragms is covered by a half-diaphragm 170a, 170b, which is for example between the relevant perforated diaphragm and the light sensor 124. The right-hand edges 172a and 172b of the half-diaphragms 170a, 170b intersect the axis of rotation of the relevant perforated diaphragm and both edges lie parallel with each other in a horizontal plane.

The two perforated diaphragms 120a, 120b are so driven in synchronism with each other that the holes 130a, 130b simultaneously wipe over the edges 127a 172b although in opposite directions. The photovoltaic cell 124 therefore during one half-cycle of the synchronised movement of rotation of both perforated diaphragms, receives for instance through the hole 130a light emanating from the pattern 12 and during the subsequent half-cycle light which is passing through the other hole 130b. When the pattern is at a standstill in relation to the device 110, there is on the pattern 12 a scanning path 149 which is formed by a semi-circular arc which is alternately travelled in one direction and the other by the scanning beam, the direction being reversed at the end points.

Figure 8A:
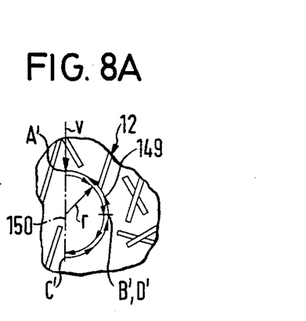
FIG. 8A is the scanning path curve generated by the device in FIG. 7, with a stationary pattern.

FIG. 8A shows according to FIG. 6 the path points A', B' and C' which correspond to the points A, B and C shown in FIGS. 2 to 5 and rigid with the object. Also shown is a point D' which corresponds to the point D in FIG. 2 after one half of the circle of the scanning curve 48 has been folded over. If, now, the pattern 12 moves in the direction of the arrow v in relation to the device 110 and which is parallel to the diameter 150 connecting the points A' and C', then the result is a scanning signal similar to FIG. 3 and correspondingly a density signal similar to FIG. 4. To determine the distance travelled, it is now only necessary to ascertain the number of scanning pulses N during movement of the scanning beam along the path curve A', B', C' now used up and then the number M of scanning pulses along the portion of path C', D', A'. By virtue of the onwards movement of the pattern 12 underneath the device 110, it is true that the path portion A', B', C' no longer coincides with the next portion of path in succession, but the two portions of scanning path are relatively close to each other so that the measurement error attributable to localised fluctuations in distribution density of pattern structure elements is still relatively small. In the case of a full circle scanning according to FIG. 6, the two arcs of the circle are however opposite each other, in other words possibly in areas whose pattern structure distribution density may well differ substantially from each other.

In the previously described method of measuring distance travelled by using the device 110, it is a prerequisite that the diameter 150 according to FIG. 8a lie parallel with the direction of speed v; correspondingly, the right-hand edges 172a and 172b of the two half-diaphragms 170a and 170b must lie parallel with the speed direction. In the case of variable direction v, the half-diaphragms 170a must be correspondingly reorientated, a direction possibly being determined beforehand by the method described with reference to FIGS. 3 to 5. For this purpose, the scanning signal emitted by the photovoltaic cell 124 may be used.

Figures 9, 9A, 9B:
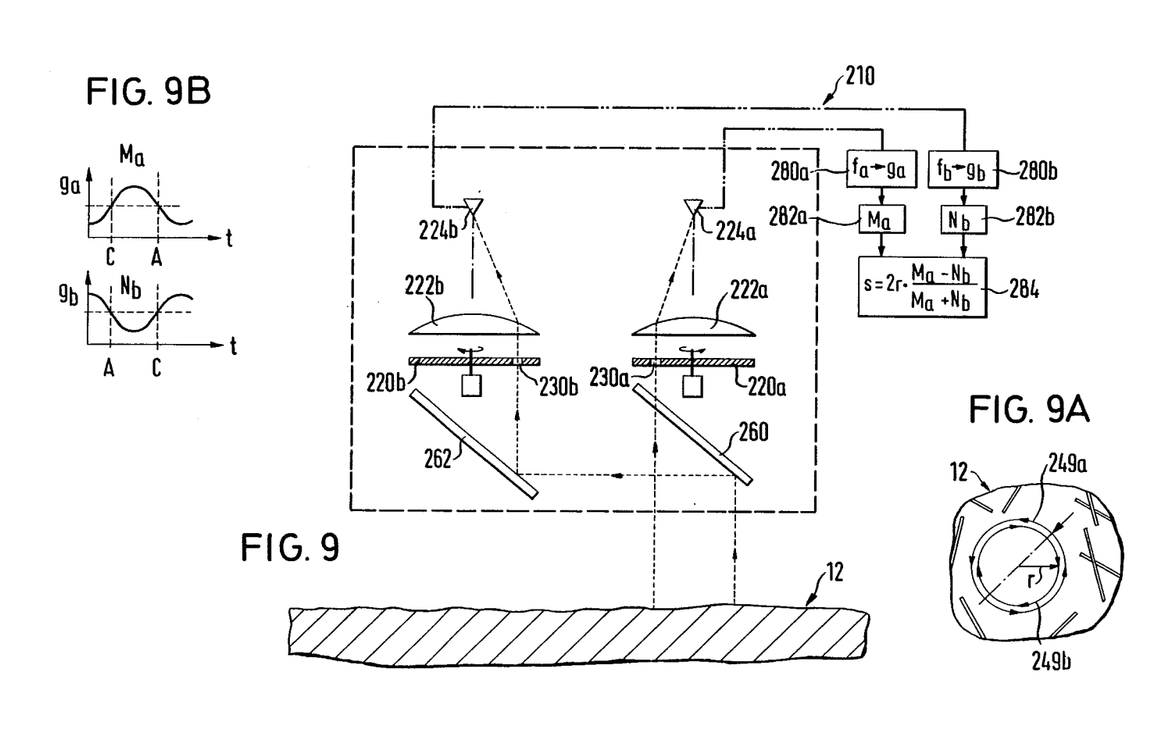
FIG. 9 shows a further embodiment of the device according to the invention.
FIG. 9A shows the scanning path curve generated by the device according to FIG. 9 when the pattern is stationary.
FIG. 9B shows the two density signals which result from scanning by means of the device according to FIG. 9.

The device according to the invention shown in FIG. 9 and designated 210 and intended for measuring movement renders this mechanical readjustment of the orientation of half-diaphragms dispensable. This device has in turn a semi-pervious mirror 260 and a totally reflecting mirror 262 for image splitting and also a separately rotating perforated diaphragm 220a, 220b above the two mirrors. However, associated with each of the two double images is a respective optical scanning system 222a and 222b with a respective photovoltaic cell 224a, 224b again disposed at each focal point on the image side. Once again, the two perforated diaphragms 220a and 220b rotate in opposite directions and at the same frequency; the distance between the axes of the two diaphragm holes 230a, 230b is in each case r. If the pattern 12 according to FIG. 9A is stationary, then there are two scanning path curves 249a and 249b in the form of jointly coincident but oppositely traversed circles.

The two photovoltaic cells 224a and 224b emit in each case scanning signals $f_a$ and $f_b$ from which it is possible separately to derive the density signal $g_a$ and $g_b$ respectively in the blocks 280a and 280b indicated in FIG. 9. Then the interval C-A is determined for one of the density signals, e.g. the density signal $g_a$ and the number $M_a$ of scanning pulses in this interval ascertained. Correspondingly, for the density signal $g_b$ the interval A-C is determined and the number $N_b$ of scanning pulses occurring during this interval can be ascertained. This is indicated symbolically by the blocks 282a and 282b. In the following step (block 284), 0 is calculated according to the formula shown.

If the value of the speed v of the pattern 12 is to be ascertained in relation to the object, then it is only necessary to form the time derivative of the displacement path ascertained in the foregoing way.

With the previously described methods according to the invention it is possible for any desired periodic or non-periodic pattern to establish the direction of relative movement in relation to a reference direction which is rigid with the object, for which purpose at least one scanning beam is moved along a curved guide path rigid with the object, the resultant scanning signal is converted to a density signal and the phase location of the density signal is established in relation to the movement of the scanning beam along the guide curve. The angular zone traversed by the guide curve may be 360° or also 180° or less. For example, if directional fluctuations expected are only in a relatively narrow angular range, then it is sufficient for the portion of guide path curve to exceed only a very slightly greater angular range. However, this angular range must be so great that the phase location of the density signal can still be determined, e.g. by establishing the position of first or higher derivatives of the density signal.

With regard to determining path travelled according to the invention, it is only necessary to take into account that the scanning beam or beams as they move along a part of the guide path always move either with the pattern or in opposition to the pattern. The guide path can be straight or curved.

I claim:

1. Method of contactless measurement of relative movement of an object with respect to a scannable pattern of structural elements, comprising the steps of moving a device with the object for scanning the pattern along a guidance curve and for generating a scanning signal in the device from a sequence of scanning pulses corresponding respectively to the scanned pattern of structural elements, scanning the pattern along a scanning path, said scanning path results as a superposition of the scanning movement along the guidance curve and the relative movement of the pattern and object, wherein the improvement comprises deriving a density signal from the scanning signal indicating the chronological progression of the reciprocal value of the time interval between the momentary scanning signal with respect to the preceding scanning signal, and determining the time phase of the density signal with said time phase being indicative of the angle between a reference direction integral with the object and the direction of motion of the pattern relative to the object.

2. Method according to claim 1, comprising the step of determining a turning point of the density signal and therefrom determining a guide angle.

3. Method according to claim 2, comprising the step of determining the direction of motion of the pattern relative to the object based on whether a minimum or maximum value of the density signal follows the turning point.

4. Method of contactless measurement of relative movement of an object with respect to a scannable pattern of structural elements, comprising the steps of moving a device with the object for scanning the pattern along a guidance curve and for generating a scanning signal in the device from a sequence of scanning pulses corresponding respectively to the scanned pattern of structural elements, scanning the pattern along a scanning path, said scanning path results as a superposition of the scanning movement along the guidance curve and the relative movement of the pattern and object, comprising the steps of scanning the pattern exhibiting several structural elements along the scanning path onto guidance curve sections in one of the direction of motion and the direction counter to the direction of motion for determining a travel path length covered by the pattern with respect to the object during the scanning time period respectively with starting and end points lying behind one another in the direction of motion, and determining the number (M, N) of the scanning pulses of the scanning signal arising during the movement of a scanning beam along the two guidance curve cases, and determining the quotient from the difference and the sum (M + N) of the two numbers (M, N), which is proportional to the travel path length (f).

5. Method according to claim 4, comprising the steps of forming two guidance curve sections as semicircular arcs which in combination form a closed circle, and arranging a diameter connecting the ends of the semicircular arcs substantially parallel to the direction of motion of the pattern with respect to the object.

6. Method according to claim 5, wherein scanning in opposite directions along the closed circle, deriving the density signal from the scanning signal obtained from each of the two opposite directions, determining in one of the density signals the two reversal points located chronologically one of before and after a density signal maximum and the number (Ma) of the scanning pulses between the reversal points and determining in the other density signal the two reversal points located one of before and after a density signal maximum and the number (Mf) of the scanning pulses between the reversal points.

7. Method according to claim 4, comprising the steps of forming the two guidance curve sections as semicircular arcs which are essentially congruent, and arranging a diameter connecting the ends of the semicircular arcs substantially parallel to the direction of motion of the pattern with respect to the object.

8. Device for the contactless measurement of the relative movement of an object in relation to a scannable pattern of structural elements, including a device for scanning the pattern and moving the device with the object for generating a scanning signal in the device from a sequence of scanning pulses corresponding to the scanned structural elements of the pattern, comprising at least one rotating perforated diaphragm (20; 120a and 120b; 220a and 220b) in the path of rays from at least one optical system having an optical axis (22; 122; 222a and 222b for scanning a light sensor comprising a photovoltaic cell (24; 124; 224a and 224b) is disposed at an image-side focal point of the optical system (22; 122; 222a and 222b) an arrangement for image splitting comprises a partly pervious mirror (160; 260) located between the diaphragm and the pattern and inclined at an angle to the optical axis of the optical system (22; 122) and in the same region located between the diaphragm and the pattern and adjacent to and parallel with the partly pervious mirror, a fully reflecting mirror (162; 262) in the path of rays of the at least one of the optical system and another optical system (222b) each said optical system includes a rotating perforated diaphragm (120a and 120b) and a half-diaphragm impervious to light (170a and 170b) in spaced parallel relation with the perforated diaphragm and half covering the perforated diaphragm, said half-diaphragm is located between said perforated diaphragm and said optical scanning system and is disposed in the path of rays from the partly pervious mirror (160) to the light sensor (124) and in the path of rays from the fully reflecting mirror (162) to the light sensor (124) in the associated optical scanning system and the perforated diaphragms (120a and 120b) rotate in opposite directions and establish two scanning beams which, when the pattern (12) is stationary in relation to the object, scans substantially identical semi-circular arc portions of scanning paths (A′ B′ C′; C′ D′ A′).

9. Device according to claim 8, wherein one said light sensor (124) associated with both said perforated diaphragms (120a and 120b).

10. Device according to claim 9, wherein said optical system (122) is associated with both said perforated diaphragms (120a and 120b).

11. Device according to claim 8, wherein said rotating perforated diaphragm (220a, 220b) is located in the path of rays from the partly pervious mirror and a first said light sensor (224a) and another rotating perforated diaphragm in the path of rays between a fully-reflecting mirror (262) and the second light sensor (224b), said perforated diaphragms (220a and 220b) rotate in opposite directions and establish two scanning beams which, when the pattern is stationary in relation to the object, scan on the pattern substantially identical full circles (249a and 249b).

12. Method of contactless measurement of relative movement of an object in relation to a scannable pattern of elements, including the steps of directing at least one beam to the object after scanning a portion of the pattern by the beam moving with the object along a scanning path on the pattern comprising superimposition of an arcuate path and the relative movement, generating a scanning signal from a sequence of scanning pulses corresponding to elements of the pattern, wherein the improvement comprises the steps of optically scanning the pattern twice along the scanning path on the pattern where the arcuate path is a semi-circular arc of radius r, and disposing a diameter connecting the ends of the semi-circular arc of the scanning path substantially parallel with the direction of relative movement and providing movement on the scanning path in opposite directions, performing scanning by one of two oppositely rotating beams and a single beam the direction of which is reversible, and ascertaining the number (Ma) of scanning pulses in one scanning direction and the number (Nb) of scanning pulses in the opposite scanning direction and multiplying the difference of the sum of two numbers of scanning pulses by twice the radius of the semi-circular arc of the scanning path for ascertaining the distance traveled.

13. Device for the contactless measurement of the relative movement of an object in relation to a scannable pattern of elements, wherein the improvement comprises means for optical scanning having an optical axis, a partly pervious beam divider mirror inclined relative to the optical axis and arranged to split the scanning beam from the pattern into two partial beams; a reflected-out partial beam from the divider mirror is deflected in a direction parallel with a let-through partial beam by a fully reflecting deflecting mirror (162; 262) disposed adjacent to and parallel with the beam divider mirror (160; 260); two oppositely rotating perforated diaphragms (120a, 120b; 220a 220b) provided one in the path of rays of the let-through partial beam and the other in the path of rays of the reflected-out partial beam; said means for optical scanning comprising one of an optical system (222a, 222b) for each partial beam with a light sensor (224a, 224b) at an image side focal point on the optical axis and an optical system (122) common to both partial beam and with a light sensor (124) in the image-side focal point which combines both partial beams, and said means for optical scanning comprising two identically oriented light-impervious half-diaphragm (170a, 170b) which half-diaphragms each cover a different one of said perforated diaphragms (120a, 120b) disposed in the path of rays of one of the reflected-out partial beams and of the let-through partial beam.

14. Device for the contactless measurement of the relative displacement of an object in relation to a scannable pattern of elements, comprising optical scanning means having an optical axis, a partially pervious beam divider mirror (160; 260) inclined relative to the optical axis and provided to split a scanning beam from the pattern into two partial beams; said two partial beams comprising a reflected-out partial beam and partial beam allowed through by said beam divider mirror with said reflected- out partial beam deflected by a fully-reflected deflecting mirror (162, 262) in a direction parallel with the allowed through partial beam and said fully-reflecting deflecting mirror (162; 262) being in the region of and parallel with the beam divider mirror (160; 260); two oppositely rotating perforated diaphragms (120a, 120b; 220a, 220b) provided in the path of the rays of one of the partial beams which is let through or is reflected out; said optical scanning means includes one of an optical scanning system (222a, 222b) provided for each partial beam with a light sensor (224a, 224b) on the image-side focal point and an optical scanning system (122) with a light sensor (124) and common to both partial beams provided at the image-side focal point combining both partial beams, two identically oriented light-impervious half-diaphragms (170a, 170b) half masking an associated said perforated diaphragm (120a, 120b), a device (282a, 282b) is arranged to receive the scanning signals from the at least one light sensor for counting scanning pulses derived from the scanning signals and corresponding to elements of the pattern during scanning along a semi-circular scanning arc in opposite scanning directions, a diameter (2r) connecting the ends of the semi-circular arcs and extending substantially parallel with the direction (v) of relative movement, and a device (284) provided for calculating the difference and the sum of the numbers (Ma) of scanning pulses in one scanning direction and the number (Nb) in the other scanning direction for calculating the path (s) traveled as a product of the scanning circle diameter (2r) and the quotient from the difference (Ma-Nb) and the sum (Ma+Nb) of the numbers of scanning pulses in the two opposite one scanning directions.

15. Device for the contactless measurement of the relative movement of an object in relation to a scannable pattern of elements including a rotating scanning beam guide, comprising optical scanning means including an optical axis, a partly pervious beam divider mirror (160; (260) inclined relative to the optical axis and provided for splitting the scanning beam from the pattern into two partial beams, the partial beams comprising a reflected-out partial beam and a let-through partial beam, the reflected-out partial beam is deflected in a direction parallel with the let-through partial beam by a fully reflecting deflecting mirror (162; 262) disposed in the region of and parallel with said beam divider mirror (160; 260), two oppositely rotating perforated diaphragms (120a, 120b; 220a, 220b) provided in the paths of rays of the let-through partial beam and reflected-out partial beam, said optical scanning means comprising one of an optical scanning system (222a, 222b) for each partial beam with a light sensor (224a, 224b) at an image-side focal point of the scanning system and an optical scanning system (122) common to both partial beams and with a light sensor (124) at the image-side focal point which combines both partial beams.

16. Device as set forth in claim 15, wherein two identically oriented light-impervious half-diaphragms (170a, 170b) of said perforated diaphragms (120a, 120b) each half masking an associated one of said perforated diaphragms (120a, 120b) disposed in the path of rays of the let-through partial beam and the reflected-out partial beam.

17. Device according to claim 16, wherein a block (282a, 282b) is arranged for receiving the scanning signals from the at least one light sensor for counting scanning pulses derivable from the scanning signals and corresponding to elements of the pattern during scanning along a semi-circular scanning arc in one of two opposite scanning directions, the diameter (2r) connecting the ends of the semi-circular arcs extending substantially parallel with the direction (v) of relative movement, and a block (284) arranged for calculating the paths traveled as a product of the scanning circle diameter (2r) and the quotient of the difference (Ma−Nb) and the sum (Ma+Nb) of the number (Ma) of scanning pulses in one scanning direction and the number (Nb) of scanning pulses in the other direction.

* * * * *